(12) United States Patent
Nock et al.

(10) Patent No.: US 11,238,364 B2
(45) Date of Patent: Feb. 1, 2022

(54) LEARNING FROM DISTRIBUTED DATA

(71) Applicant: National ICT Australia Limited, Eveleigh (AU)

(72) Inventors: Richard Nock, Eveleigh (AU); Giorgio Patrini, Eveleigh (AU)

(73) Assignee: NATIONAL ICT AUSTRALIA LIMITED, Eveleigh (AU)

( * ) Notice: Subject to any disclaimer, the term of this patent is extended or adjusted under 35 U.S.C. 154(b) by 1087 days.

(21) Appl. No.: 15/550,302

(22) PCT Filed: Feb. 12, 2016

(86) PCT No.: PCT/AU2016/050088
§ 371 (c)(1),
(2) Date: Aug. 10, 2017

(87) PCT Pub. No.: WO2016/127218
PCT Pub. Date: Aug. 18, 2016

(65) Prior Publication Data
US 2018/0018584 A1 Jan. 18, 2018

(30) Foreign Application Priority Data
Feb. 13, 2015 (AU) .............................. 2015900463

(51) Int. Cl.
*G06N 20/00* (2019.01)
*G06F 16/28* (2019.01)

(52) U.S. Cl.
CPC ........... *G06N 20/00* (2019.01); *G06F 16/285* (2019.01)

(58) Field of Classification Search
CPC .............................. G06N 20/00; G06F 16/285
See application file for complete search history.

(56) References Cited

U.S. PATENT DOCUMENTS

| | | | |
|---|---|---|---|
| 2005/0021221 A1 | 1/2005 | Cole et al. | |
| 2005/0143971 A1* | 6/2005 | Burstein | G06F 40/253 |
| | | | 704/4 |
| 2008/0027887 A1* | 1/2008 | Barbu | G06N 20/00 |
| | | | 706/25 |
| 2011/0258195 A1* | 10/2011 | Welling | G06K 9/72 |
| | | | 707/740 |

(Continued)

FOREIGN PATENT DOCUMENTS

CN 103049482 A 4/2013

OTHER PUBLICATIONS

Lin, Keng-Pei, and Ming-Syan Chen. "Privacy-preserving outsourcing support vector machines with random transformation." Proceedings of the 16th ACM SIGKDD international conference on Knowledge discovery and data mining. 2010. (Year: 2010).*

(Continued)

*Primary Examiner* — Li B. Zhen
*Assistant Examiner* — Henry Nguyen
(74) *Attorney, Agent, or Firm* — Kilpatrick Townsend & Stockton LLP

(57) ABSTRACT

This disclosure relates to learning from distributed data. In particular, it relates to determining multiple first training samples from multiple first data samples. Each of the multiple first data samples comprises multiple first feature values and a first label that classifies that first data sample. A processor determines each of the multiple first training samples by selecting a first subset of the multiple first data samples such that the first subset comprises data samples with corresponding one or more of the multiple first feature values, and combining the first feature values of the data samples of the first subset based on the first label of each of the first data samples of the first subset. The resulting training samples can be combined with training samples from other databases that share the same corresponding features and entity matching is unnecessary.

7 Claims, 4 Drawing Sheets

500

502 receive multiple first training samples, each of the multiple first training samples being a combination of a subset of multiple data samples such the subset comprises data samples with corresponding one or more of multiple feature values 504 determining each of the multiple combined training samples by randomly selecting a subset of the multiple first training samples and combining the feature values of the first training samples of the subset.

(56) References Cited

U.S. PATENT DOCUMENTS

| | | |
|---|---|---|
| 2013/0124561 A1 | 5/2013 | Pradhan et al. |
| 2014/0095426 A1 | 4/2014 | Nicholson et al. |
| 2015/0063688 A1* | 3/2015 | Bhardwaj ............ G06K 9/3258 382/159 |

OTHER PUBLICATIONS

Chen, Shang-Liang, and Y. W. Jen. "Data fusion neural network for tool condition monitoring in CNC milling machining." International journal of machine tools and manufacture 40.3 (2000): 381-400. (Year: 2000).*

International Search Report and Written Opinion of the International Search Authority corresponding to PCT/AU2016/050088 dated Apr. 18, 2016.

Cheplygina, et al., "On Classification with Bags, Groups and Sets", Oct. 8, 2014, 18 pages.

Patrini, et al., "(Almost) No Label Cry", Oct. 19, 2018, 37 pages.

Nock, et al., "Rademacher Observations, Private Data and Boosting", Aug. 31, 2018, 45 pages.

Quadrianto, et al., "Estimating Labels from Label Proportions", Oct. 2009, 26 pages.

Yu, et al., "On Learning with Label Proportions", Feb. 24, 2014, 13 pages.

Extended European Search report from related application No. 16748488.0, dated Sep. 18, 2018, 11 pages.

\* cited by examiner

500

502 — receive multiple first training samples, each of the multiple first training samples being a combination of a subset of multiple data samples such the subset comprises data samples with corresponding one or more of multiple feature values 504 — determining each of the multiple combined training samples by randomly selecting a subset of the multiple first training samples and combining the feature values of the first training samples of the subset.

Algorithm 1 Logistic regression with Rademacher observations

Input Sample $S$ of size $m$, $n$ number of rados;
Step 1: Sample uniformly $\mathcal{U}$ of size $n$ from $\{\sigma \in \Sigma_m\}$;
Step 2: Form $\{\pi_\sigma : \sigma \in \mathcal{U}\}$ from $S$;
Step 3: Let $\theta^* \leftarrow \operatorname{argmin}_\theta \frac{1}{n} \sum_{\sigma \in \mathcal{U}} \exp\left(-\theta^\top \pi_\sigma\right)$ ;
Return $\theta^*$

Algorithm 2 Sampling of block Rademacher observations

---

Input $\Pi(\mathcal{BB}) = \{\pi_t, t \in [H]\}$, $n$ number of rados to sample;
Step 1: $B \leftarrow \emptyset$;
Step 2: for $t = 1, 2, \ldots, n$
    Step 2.1: Sample a binary string $s \in \{0,1\}^H$;
    Step 2.2: $\pi_{t'} \leftarrow \sum_{t=1}^{H} s_t \cdot \pi_t$;
    Step 2.3: $B \leftarrow B \cup \{\pi_{t'}\}$;
Return $B$;

Algorithm 3 Data fusion and learning with block Rademacher observations

---

Input Samples $(\mathcal{S}_1, \mathcal{S}_2)$ of size $m$, $\mathcal{BB}$ set of basic blocks, $n$ number of rados;
Step 1: Compute $\{\pi_t^j : b_t \in \mathcal{BB}\}$ from $\mathcal{S}_j$, $j \in [2]$;
Step 2: Form $\Pi(\mathcal{BB}) = \{\pi_b = (\pi_b^1, \pi_b^2)\}$
Step 3: Sample $B$ with Algorithm (2);
Step 4: Normalize every element of $B$;
Step 5: Let $\theta^* \leftarrow \mathrm{argmin}_\theta \frac{1}{n} \sum_{\pi_t \in B} \exp\left(-\theta^\top \pi_t\right)$;
Return $\theta^*$

LEARNING FROM DISTRIBUTED DATA

CROSS-REFERENCE TO RELATED APPLICATIONS

The present application claims priority from Australian Provisional Patent Application No 2015900463 filed on 13 Feb. 2015, the content of which is incorporated herein by reference.

TECHNICAL FIELD

This disclosure relates to learning from distributed data.

BACKGROUND ART

Companies that provide services or products over the Internet often collect a wide range of data from their customers and process this data to obtain aggregated insights into their client's behaviour.

In many cases, data related to one individual consumer can be found in multiple separate databases. However, most of these databases do not share a common unique identifier, such as a social security number. Therefore, it is difficult to use the data from these two databases for learning.

FIG. 1 illustrates a prior art scenario 100 comprising an individual 102, a data aggregator 104, such as a company, a first database 106 and a second database 108. As indicated by arrows 110 and 112, data related to individual 102 is contained in both databases 106 and 108.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

DISCLOSURE OF INVENTION

There is provided a computer implemented method for determining multiple first training samples from multiple first data samples. Each of the multiple first data samples comprises multiple first feature values and a first label that classifies that first data sample. The method comprises:
  determining each of the multiple first training samples by
    selecting a first subset of the multiple first data samples such that the first subset comprises data samples with corresponding one or more of the multiple first feature values, and
    combining the first feature values of the data samples of the first subset based on the first label of each of the first data samples of the first subset.

Since data samples are combined that share corresponding features, that is, are in the same block of the dataset, the resulting training samples can be combined with training samples from other databases that share the same corresponding features. As a result, entity matching is unnecessary, which means higher accuracy and lower computational complexity compared to other methods when learning from separate datasets.

The multiple first data samples may be data samples of a first data set and the corresponding one or more of the multiple first feature values may also be corresponding feature values of a second subset of multiple second data samples of a second data set.

The method may further comprise combining two or more of the multiple first training samples to thereby determine combined training samples.

Combining the two or more of the multiple first training samples may comprise adding the two or more of the multiple first training samples.

Selecting the first subset may comprise selecting all of the multiple first data samples with corresponding one or more of the multiple feature values.

Selecting a first subset of the multiple first data samples may comprise selecting a first subset of the multiple first data samples such that the first subset comprises data samples with corresponding two or more of the multiple first feature values.

Selecting a first subset of the multiple first data samples may comprise selecting a first subset of the multiple first data samples such that the first label is identical for the first subset of the multiple first data samples.

Combining the first feature values of the data samples may comprise determining a sum of the first feature values of the first data samples such that the feature value of a feature of the first training sample is the sum of the first feature values of that feature of the data samples.

Determining the sum may comprise determining a weighted sum that is weighted based on the first label of each of the first data samples.

The first data samples may have signed real values as first features values and the first label may be one of '−1' and '+1'.

Selecting the first subset may comprise selecting the first subset such that the first subset comprises only data samples with identical one or more of the multiple first feature values.

A method for fusing a first training data set with a second training data set comprises:
  performing the method of claim 1 for the first training data set to determine multiple first training samples;
  performing the method of claim 1 for the second training data set to determine multiple second training samples; and
  merging each of the multiple first training samples with one of the multiple second training samples that is based on the same identical feature values as that first training sample.

Merging each of the multiple first training samples with one of the multiple second training samples may comprise determining a third training sample comprising
  the one or more identical feature values,
  the first feature values of that first training sample other than the corresponding one or more feature values, and
  the second feature values of the one of the multiple second training samples other than the corresponding one or more feature values.

Software, when installed on a computer, causes the computer to perform the above method.

A computer system for determining multiple first training samples comprises:
  an input port to receive multiple data samples, each of the multiple data samples comprising multiple feature values and a label that classifies that data sample; and
  a processor to determine each of the multiple first training samples by selecting a subset of the multiple data samples such that the subset comprises data samples with corresponding one or more of the multiple first feature values, and combining the feature values of the data samples of the subset based on the label of each of the data samples of the subset.

A method for determining multiple combined training samples comprises:

receiving multiple first training samples, each of the multiple first training samples being a combination of a subset of multiple data samples such the subset comprises data samples with corresponding one or more of multiple feature values;

determining each of the multiple combined training samples by randomly selecting a subset of the multiple first training samples, and combining the feature values of the first training samples of the subset.

Software that, when installed on a computer, causes the computer to perform the above method for determining multiple combined training samples.

A computer system for determining multiple combined training samples comprises:

an input port to receive multiple first training samples, each of the multiple first training samples being a combination of a subset of multiple data samples such the subset comprises data samples with corresponding one or more of multiple feature values; and a processor to determine each of the multiple combined training samples by randomly selecting a subset of the multiple first training samples, and combining the feature values of the first training samples of the subset.

An example will be described with reference to

Figure 1:
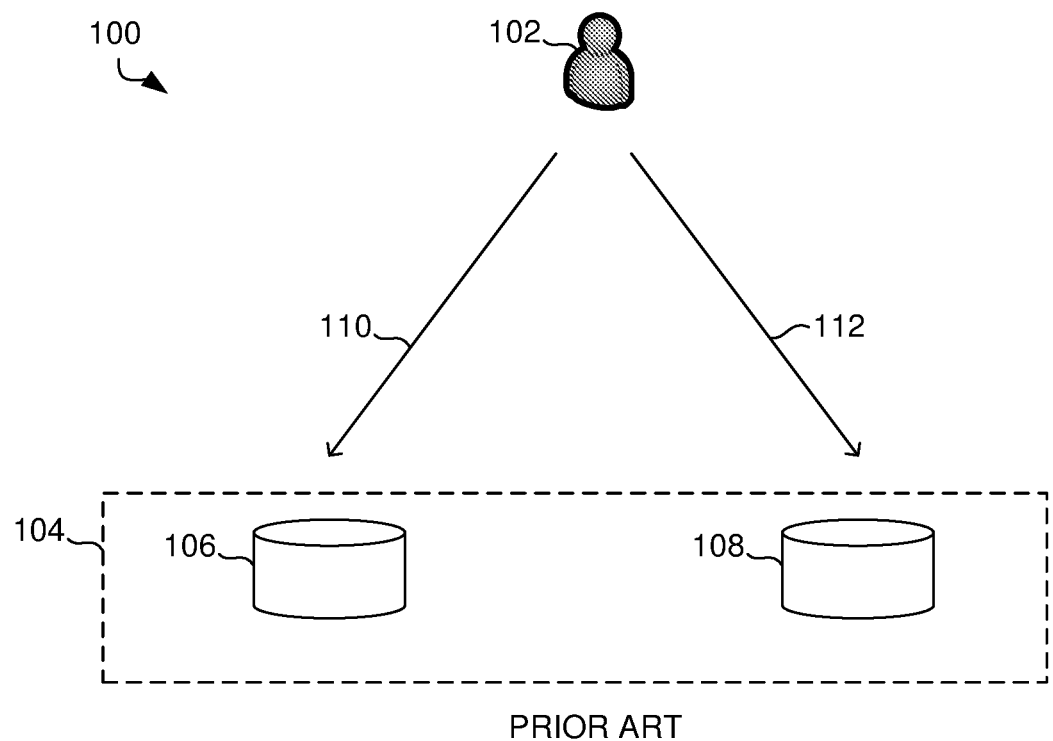
FIG. 1 illustrates a prior art scenario of a data aggregator storing an individual's data on separate databases.
Figure 2:
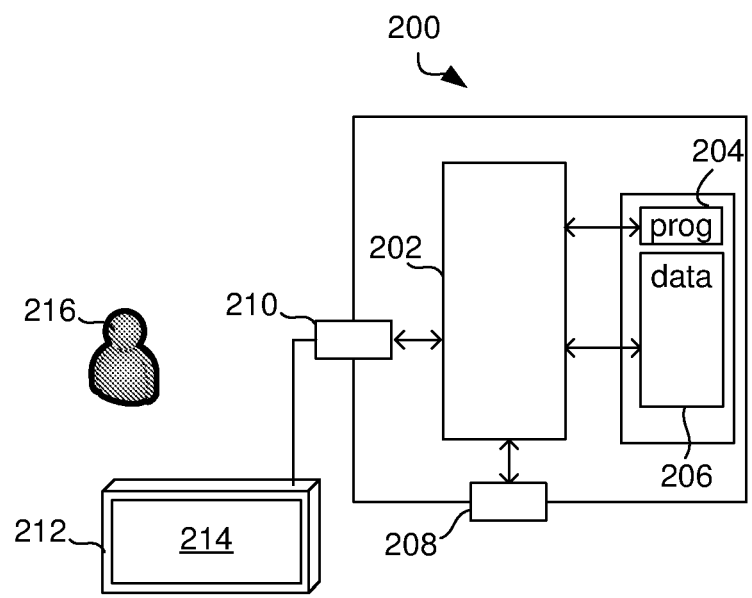

FIG. 2 illustrates a computer system 200 for learning from distributed data.

Figure 3:
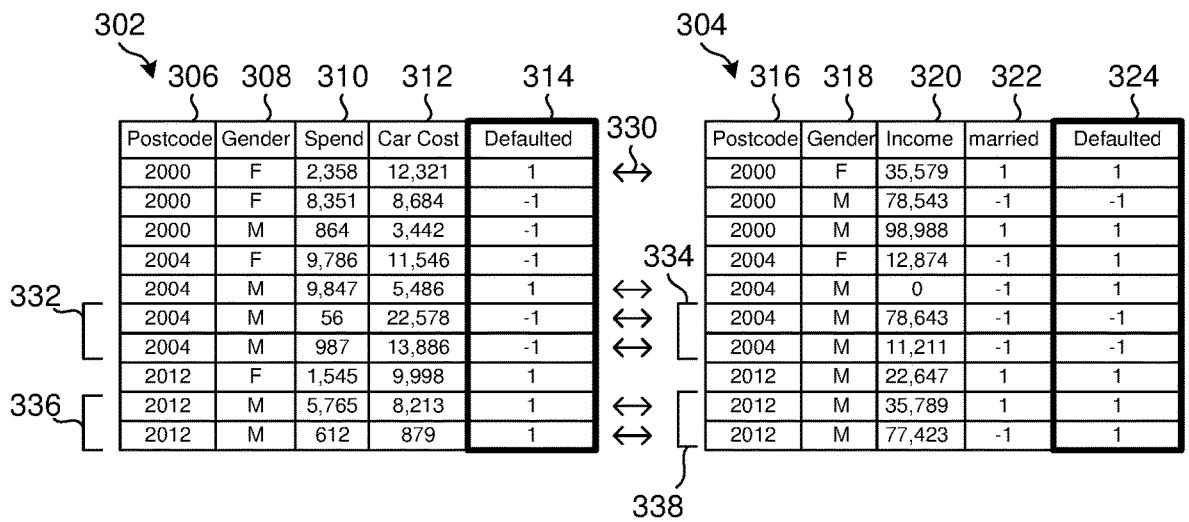

FIG. 3 illustrates two dataset that are to be fused.

Figure 4:
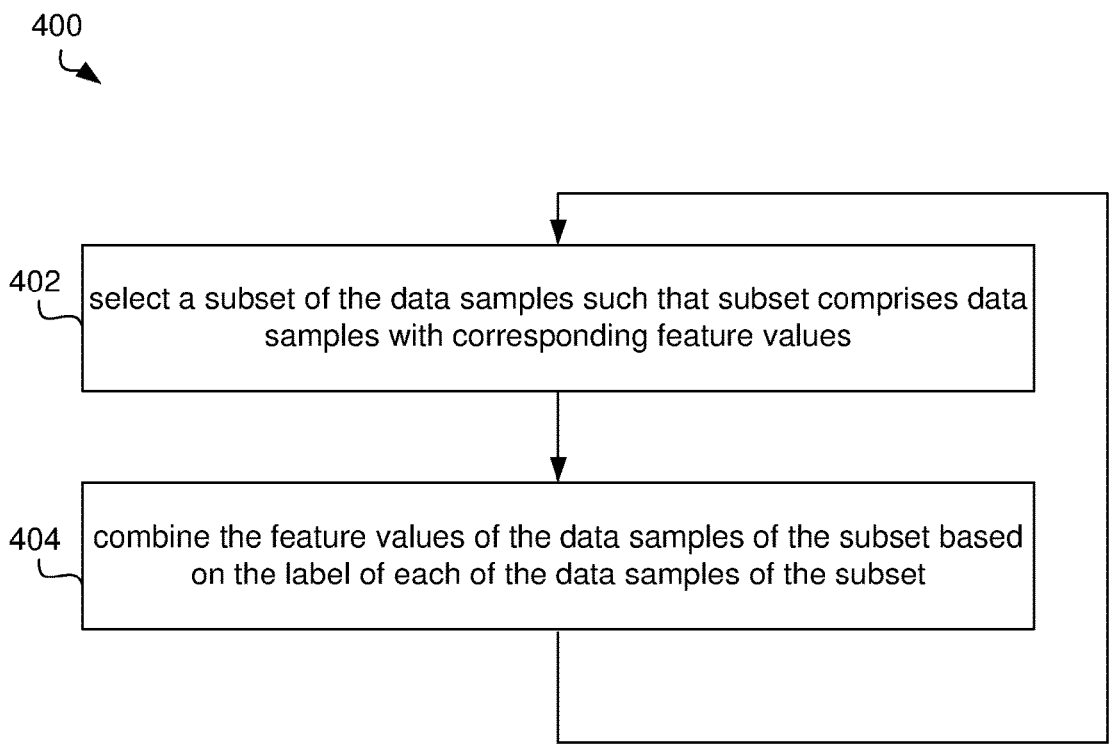

FIG. 4 illustrates a method for determining training samples from data samples of one of the datasets of FIG. 3.

FIG. 5 illustrates a method for determining multiple combined training samples from multiple training samples.

FIG. 6 illustrates an algorithm for logistic regression.

FIG. 7 illustrates an algorithm for sampling of blocked observations.

FIG. 8 illustrates an algorithm for data fusion and learning.

BEST MODE FOR CARRYING OUT THE INVENTION

FIG. 2 illustrates a computer system 200 for learning from distributed data by determining multiple training samples from multiple data samples. The computer system 200 may be a mobile phone and comprises a processor 202 connected to a program memory 204, a data memory 206, a communication port 208 and a user port 210. The program memory 204 is a non-transitory computer readable medium, such as a hard drive, a solid state disk or CD-ROM.

Software, that is, an executable program stored on program memory 204 causes the processor 202 to perform the method in FIG. 3, that is, processor 402 determines each of the multiple training samples by selecting a subset of the multiple data samples such that the subset comprises data samples with corresponding feature values. Processor 202 then combines the feature values of the selected data samples to determine that training sample.

In one example, one dataset is stored on data memory 206. A second and further datasets may then be stored on other computer systems similar to computer system 200. In some examples, all datasets are stored on data memory 206 or no dataset is stored on data memory 206. The datasets may be stored on cloud storage, such as a distributed hash table (DHT).

The processor 202 may store the determined training samples or classifier coefficients on data store 206, such as on RAM or a processor register. Processor 202 may also send the determined training samples or classifier coefficients via communication port 208 to another computer system, such as another mobile phone. Processor 202 or another computer system that receives the training samples can then perform a learning algorithm, such as a regular convex learning algorithm or logistic regression algorithm to determine a classifier.

The processor 202 may receive data, such as data of the data samples or training samples, from data memory 206 as well as from the communications port 208 and the user port 210, which is connected to a display 212 that shows a visual representation 214 of the data set or characterisation of the data set to a user 216. In one example, the processor 202 receives the data from a storage device via communications port 208, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 202 receives and processes the data set in real time. This means that the processor 202 determines the training samples every time new data samples are received and completes this calculation before the next data update is provided.

Although communications port 208 and user port 210 are shown as distinct entities, it is to be understood that any kind of data port may be used to receive data, such as a network connection, a memory interface, a pin of the chip package of processor 202, or logical ports, such as IP sockets or parameters of functions stored on program memory 204 and executed by processor 202. These parameters may be stored on data memory 206 and may be handled by-value or by-reference, that is, as a pointer, in the source code.

The processor 202 may receive data through all these interfaces, which includes memory access of volatile memory, such as cache or RAM, or non-volatile memory, such as an optical disk drive, hard disk drive, storage server or cloud storage. The computer system 200 may further be implemented within a cloud computing environment, such as a managed group of interconnected servers hosting a dynamic number of virtual machines.

It is to be understood that any receiving step may be preceded by the processor 202 determining or computing the data that is later received. For example, the processor 202 determines the training samples or classifier coefficients and stores them in data memory 206, such as RAM or a processor register. The processor 202 then requests the data from the data memory 206, such as by providing a read signal together with a memory address. The data memory 206 provides the data as a voltage signal on a physical bit line and the processor 202 receives the training samples or classifier coefficients via a memory interface.

FIG. 3 illustrates a first dataset 302 and a second dataset 304 that are to be fused. The two datasets 302 and 304 contain features of the same real-world entities from different views, e.g. banking and insurance company records of the same customer base. In this example, the first dataset 302 comprises columns for features postcode 306, gender 308, monthly credit card spend 310, monthly estimated cost 312 of the this individual's car (based on model, make, etc.) and a column for a label 314 which indicates whether this individual defaulted in the last 12 months.

The second dataset also comprises feature columns for postcode 316, gender 318 and label column 324. Second dataset 304 comprises further feature columns for annual income 320 and marital status 322. For simplicity of presentation both datasets 302 and 304 are shown sorted by postcode and gender. However, in other examples the datasets may not be sorted.

The aim is to learn a classifier leveraging all of the data, in the hard case in which no shared identifier maps the views between the two sources 302 and 304. In the example of FIG. 3, some individuals are common to both datasets 302 and 304 as indicated by double arrows, such as double arrow 330. As a result, the corresponding rows share the same postcode 306/316, gender 308/318 and label 314. It is noted, however, that these rows may also belong to two different individuals that share the same postcode, gender and label.

Entity matching aims to identify the matching rows that are associated to the same individual. However, entity matching is not exact in cases where the rows contain no unique identifier, such as social security number. As a result, features of rows are considered to belong to a single observation although they are related to different individuals. This may lead to learning a severely impaired classifier that significantly differs from an oracle classifier obtained from perfect matching.

FIG. 4 illustrates a method 400 for determining training samples from the data samples of first dataset 302. The description further below explains how these training samples can be used in a learning method to learn from the datasets 302 and 304 without entity matching. Method 400 is a blueprint or pseudo-code for a computer program that may be implemented in C++, Java, Python or other languages, compiled and stored on program memory 204. Processor 202 then executes the individual commands of the computer program to perform method 400.

As described above, each of the data samples of dataset 302 comprises feature values 306, 308, 310 and 312 and a label 314 that classifies that data sample. Processor 202 determines each training sample individually by performing the following steps.

Processor 402 first selects a subset 332 of the data samples in dataset 302 such that the subset 332 comprises data samples with corresponding one or more of the multiple first feature values. In the examples below, the term 'corresponding' is used interchangeably to 'identical'.

However, in other examples, processor 202 selects subsets such that the selected samples show some similarity between their respective feature values. In one example, names and surnames are shared features and processor 202 selects data samples with feature values "John Smith", "J. Smith", or "John C. Smith" for the same subset. In other words, these slightly different but sufficiently similar feature values are referred to as 'corresponding' feature values. In another example, the postcode is shared and processor 202 selects data samples with "2000", "2OOO" (letter 'o' instead of number zero), or "20**" for a subset. Again, these slightly different but sufficiently similar feature values are referred to as 'corresponding' feature values. This way processor 202 handles noise or missing values in the shared feature.

It is noted that the terms 'subset' and 'block' are being used interchangeably herein unless noted otherwise. In the example of FIG. 3, processor 202 selects subset 332 because the feature values for the postcode column 306 and the gender column 308 are identical for the two data samples of subset 332. In this example, the label 314 is also identical for these data samples. It is noted that processor 202 may select the subset based on one corresponding feature value, two corresponding feature values or any other number of corresponding feature values.

It is noted that in the example of FIG. 3 the number of data samples in data set 302 is only small and therefore, there are only a small number of samples in each subset. However, in most applications, the number of data samples are significantly larger, such as 100,000 and therefore, the subsets contain more data samples.

Processor 202 then combines 402 the feature values 306, 308, 310 and 312 of the data samples of subset 332 based on the label 314 of each of the data samples of the subset 332. In one example, processor 202 adds feature values 306, 308, 310 and 312 of each column by calculating a weighted sum that is weighted by the label 314. In a further example, processor 202 calculates the weighted sum of only those feature values that are not identical within the subset 332.

In the example of FIG. 3, the calculation for subset 332 would be:

56*(−1)+987*(−1) for the annual spend feature 310 and 22,578*(−1)+13,886 (−1) for the car cost feature 312.

The resulting training sample is then (2004, M, −1,043, −36,464), which is also referred to as 'basic rado' below. This computation is set out more formally below in Definition 1.

Similarly, the second data set 304 comprises subset 334. The feature values 306 and 308 that correspond for subset 332 also correspond for subset 334. That is, these samples relate to males in postcode 2004. Before method 400 commences, processor 202 may receive identifiers of the feature values that are identical for the first subset 332 as well as the second subset 334. These identifiers may be determined in a pre-processing step where the datasets 302 and 304 are analysed for most suitable features to define the subsets or blocks. In one example, processor 202 simply checks which of the features of the first dataset 302 are also features of the second dataset 304. In the example of FIG. 3, processor 202 determines that postcode and gender appear in both datasets.

The calculation for subset 334 is:
78,643*(−1)+11,211*(−1) and (−1)*(−1)+(−1)*(−1) resulting in
(2004, M, −89,854, 2) as a training sample.

Merging the training samples from subsets 332 and 334, respectively, without repeating the corresponding feature values results in:
(2004, M, −1,043, −36,464, −89,854, 2).

The above example merges the non-shared features and keeps the shared features, that is, the corresponding features, constant. This can be useful for learning decision trees over the shared features and linear separators for non-shared features.

In another example, the shared features are treated in the same way as the non-shared features in order to rely on linear separators only, which therefore imply to extend the transformation of non-shared features to shared features.

In the example of FIG. 3, the calculation for subset 332 would be:
2004*(−1)+2004*(−1) for the postcode feature 306,
(−1)*(−1)+(−1)*(−1) for the gender feature 308,
56*(−1)+987*(−1) for the annual spend feature 310 and
22,578*(−1)+13,886 (−1) for the car cost feature 312.

The resulting training sample is then (−4008, 2, −1,043, −36,464), which is also referred to as 'basic rado' below.

The calculation for subset 334 is:
2004*(−1)+2004*(−1) and (−1)*(−1)+(−1)*(−1) and 78,643*(−1)+11,211*(−1) and (−1)*(−1)+(−1)*(−1) resulting in (−4008, 2, −89,854, 2) as a training sample.

Merging the training samples from subsets 332 and 334, respectively, results in: (−4008, 2, −1,043, −36,464, −89, 854, 2).

Processor 202 can post process basic rados to reduce the number of values, such as to binary values. In one example, the non-corresponding feature values spend 310, car cost 312, income 320 are converted into binary values '+1' and '−1' by applying a threshold value. In one example, the threshold for credit card spend 310 is 500, for car cost 312 is 30,000 and for income 320 is 50,000.

The simplified calculation for subset 332 is then:
(−1)*(−1)+1*(−1)=0 for credit card spend 310, which indicates that the credit card spend 310 does not influence the defaulting risk for males in postcode 2004; and
(−1)*(−1)+(−1)*(−1)=2 for car cost 312 which indicates that the selected males in postcode 2004 who spend more on their cars are less likely to default.

Similarly, the simplified calculation for subset 334 is then:
1*(−1)+(−1)*(−1)=0 for annual income 320, which indicates that the annual income 320 does not influence the defaulting risk for males in postcode 2004; and
(−1)*(−1)+(−1)*(−1)=2 for marital status 322 which indicates that being married increases the risk of defaulting for males in postcode 2004.

The merged training sample is then (2004, M, 0, 2, 0, 2) in the example where shared features and non-shared features are treated differently and (−4008, 2, 0, 2, 0, 2) in the example where shared features are treated equally to non-shared features as described above. Shared values can be post-processed as well, such as to reduce the post-code to two binary values '+1' and '−1', such as for example '+1' if it belongs to interval [2000,2050] and '−1' otherwise.

In the example of FIG. 3 there is a further subset 336 in first data set 302, which results in a training sample (before merging) of (2012, M, 2, −2) (or (4024, −2, 2, −2) for equal processing of shared and non-shared features) and a further subset 338 in second dataset 304, which results in a training sample of (2012, M, 0, 0) (or (4024, −2, 0, 0) for equal processing of shared and non-shared features). Consequentially, the merged second training sample would be (2012, M, 2, −2, 0, 0) (or (4024, −2, 2, −2, 0, 0) for equal processing of shared and non-shared features).

As this shows, there are two merged training samples from two subsets in each dataset. In other words, the number of training samples is identical to the number of subsets or blocks. However, for learning algorithms often provide a better performance if the number of training samples is higher.

FIG. 5 illustrates a method 500 for determining multiple combined training samples as performed by processor 202. It is noted that method 500 may be performed by a different processor of a different computer system to the processor that performs method 400 for generating training samples. In one example, method 500 is performed remotely from method 400.

Performing method 500, processor 202 receives multiple first training samples. As described above, each of the multiple training samples is a combination of a subset of multiple data samples such the subset comprises data samples with corresponding one or more of multiple feature values.

Processor 202 then randomly selects a subset of the multiple first training samples and combines the feature values of the first training samples of the subset to determine the combined training sample.

This allows processor 202 to generate as many combined training samples as there are combinations of one or more subsets. In the example of FIG. 3 there is only one combination of the two subsets, that is, processor 202 determines a third training sample. However, in the case of larger dataset with 2 different postcodes there are 8 subsets considering the gender feature and the label each double the number of subsets. This allows 255 different combinations and processor 202 selects random combinations of these to determine further combined training samples.

Processor 202 may determine the combined training samples by adding the feature values, that is, combining the two training samples above would give (2012, M, 2, 0, 0, 2) (or (4024, −2, 2, 0, 0, 2) for equal processing of shared and non-shared features) as a third combined training sample.

It is noted that the above transformations including the calculations for equal processing of shared and non-shared features are consistent with Definition 2 below.

In one example, processor 202 learns a binary classifier, that is determines classifier coefficients, in the cross product space of both domains 302 and 304 without the need to perform entity matching between the two domains 302 and 304. The learning may be based on a formulation of the logistic loss as a function of certain aggregated statistics, which are referred to as Rademacher observations (rados). Once the classifier is learned, that is, the classifier coefficients are determined, processor 202 can determine an estimated label for new data samples without a label. For example, processor 202 can receive postcode, gender, credit card spend, car cost, income and marital status of an individual and determine whether that individual is likely to default based on the classifier coefficients.

The minimization of the logistic loss over the original observations is equivalent to the minimization of an exponential rado-loss over these rados. Therefore, processor 202 can learn classifiers disregarding individual observations, as they are effectively unknown.

It is noted that merging datasets, as a means of obtaining new features for existing instances, has the potential to considerably boost predictive power. Insurance and banking data together may improve fraud detection; shopping records may well complement medical history for estimating risk of disease. Data fusion, the process of merging entities of noisy and heterogeneous datasets, may be effective for prediction problems in several domains, for example, in genomics.

In one example, datasets 302 and 304 are maintained by separate organisations wanting to leverage the joint power of their data assets without sharing a common ID (which would reveal to one organisation the other's view of its individual customers).

Rados are aggregated statistics on subsets of the learning sample. They allow expressing the surrogate risk based on the logistic loss in a convenient form, such that no individual example is required for its evaluation. Working at such an aggregated level, no entity match is needed.

Two fundamental results facilitate the learning operation. First, the equivalence between losses holds for the whole set of rados, whose number is exponential in the sample size, and hence intractable. However, from a statistical standpoint, a large number of rados is not necessary for learning, in light of concentration properties presented below.

Second, as stated above, although entity resolution is not needed, building rados from multiple datasets is not straightforward. It turns out that when some of the features are shared among the datasets, e.g. gender, postcode, we processor 202 match subsets (blocks) of examples, hence their rados. The information required is much coarser than knowing how to match entities.

Let $n \in \mathcal{N}_*$ and $[n]=\{1, 2, \ldots, n\}$. We use boldfaces like v to indicate vectors, whose coordinates are denoted as $v_i$ for $i \in [n]$. The task of binary classification with linear models $\theta$ comprises learning a predictor for label y, from a learning sample $\mathcal{S} = \{(x_i, y_i), i \in [m]\}$. Each example is an observation-label pair $(x_i, y_i) \in \mathcal{X} \times \{-1, +1\}$, with $\mathcal{X} \subseteq \mathbb{R}^d$, and it is drawn i.i.d. from an unknown distribution $\mathcal{D}$. The label is predicted by the sign of $\theta^T x$. The word entity refers to a generic record in a dataset, as the object of entity matching, and attributes to point to its values.

The setting in FIG. 3 is different in the following sense. Two disjoint (learning) samples $\mathcal{S}_j$, $j \in [2]$ are given. Each one is defined in its own feature space $\mathcal{X}_j = \otimes_{k=1}^{d_j} \mathcal{X}_j^k \subseteq \mathbb{R}^{d_j}$, with $\mathcal{X} = \mathcal{X}_1 \times \mathcal{X}_2 \subseteq \mathbb{R}^d$, $d = d_1 + d_2$ and $\mathcal{X}_j^i$ being the space spanned by feature i of view j. Examples in $\mathcal{S}_1\{(x_i^1, y_i^1), i \in [m]\}$ are mapped by $\rho(i)$ to their views in $\mathcal{S}_2\{(x_{\rho(i)}^2, y_{\rho(i)}^2), i \in [m]\}$. The goal is to learn a linear classifier $\theta$ for $x \in \mathcal{X}$.

The proposed method may be extended with kernels.

The following assumptions may be used:

The disjoint samples are views of the same m observations, i.e. $\rho: [m] \to [m]$ is a 1-to-1 map between in $\mathcal{S}_1$ and $\mathcal{S}_2$; $\rho$ is unknown.

Labels are consistent between the disjoint samples: $y_i^1 = y_{\rho(i)}^2 = y_i$.

No label is missing.

If we map $\rho$ was known, the three assumptions would allow processor 202 to form a sample $\mathcal{S}$ by concatenation as $\{(x_i^1, x_{\rho(i)}^2, y_i), i \in [m]\}$.

An idealised process may create $\mathcal{S}_1$ 302 and $\mathcal{S}_2$ 304 in FIG. 3 from $\mathcal{S}$ (not shown): 1) partition the feature space $\mathcal{X}$ into $\mathcal{X}_1$ and $\mathcal{X}_2$; 2) split all observations $x_i$ accordingly and assign them to $\mathcal{S}_1$ and $\mathcal{S}_2$; 3) assign $y_i$ to both the relative split observations in $\mathcal{S}_1$ and $\mathcal{S}_2$; 4) reorder $\mathcal{S}_2$ through $\rho$.

Finding an approximate permutation to merge the datasets for the purpose of learning may result in a classifier significantly different from one obtained with the true permutation.

Rademacher Observations and Logistic Loss

Let $\Sigma_m = \{-1, 1\}^m$. Then [1]

Definition 1: For any $\sigma \in \Sigma_m$, the Rademacher observation $\pi_\sigma$ with signature $\sigma$ is $$\pi_\sigma = (1/2) \Sigma_{i=1}^m (\sigma_i + y_i) x_i.$$

The reference to $\mathcal{S}$ is implicit in the definition of $\pi_\sigma$. A Rademacher observation thus sums the terms $y_i x_i$ over the subset of examples for which $y_i = \sigma_i$. When $\sigma = y$ is the vector of classes, $\pi = m\mu\mathcal{S}$ is m times the mean operator. When $\sigma = -y$, we get the null vector $\pi_\sigma = 0$.

An approach to learn $\theta$ over $\mathcal{S}$ is to fit it to the minimization of the surrogate risk $F_{log}(\mathcal{S}, \theta)$ built from the logistic loss:

$$F_{log}(\mathcal{S}, \theta) = \frac{1}{m} \sum_{i=1}^m \log(1 + \exp(-y_i \theta^T x_i)). \quad (1)$$

The exponential rado-risk $F_{exp}^\pi(\mathcal{S}, \theta, \mathcal{U})$, may be computed by processor 202 on any $\mathcal{U} \subseteq \Sigma_m$, as:

$$F_{exp}^\pi(\mathcal{S}, \theta, \mathcal{U}) = \frac{1}{n} \sum_{\sigma \in \mathcal{U}} \exp(-\theta^T \pi_\sigma). \quad (2)$$

When $\mathcal{U} = \Sigma_m$, it turns out that, $F_{log}$ and $F_{exp}^\pi$ are related via a simple monotonous relationship; hence, minimizing one criterion is equivalent to minimizing the other and vice versa.

The following holds true, for any $\theta$ and $\mathcal{S}$:

$$F_{log}(\mathcal{S}, \theta) = \log(2) + \frac{1}{m} \log F_{exp}^\pi\left(\mathcal{S}, \theta, \sum_m\right). \quad (3)$$

This may be a statement of sufficiency of the whole set of Rademacher observations w.r.t. the learning sample $\mathcal{S}$ for the logistic loss; this generalizes the sufficiency of the mean operator for the label variable.

However, being the size of $\Sigma_m$ exponential in m, the above equivalence may not be practical since exponentially many rados would be required for learning. Thus, processor 202 quantifies the approximation of the surrogate risk only using $|\mathcal{U}| = n = 2^m$ rados.

The next result elaborates probabilistic bounds of $|F_{log}(\mathcal{S}, \theta, \mathcal{U}) - F_{log}(\mathcal{S}, \theta)|$, where $$F_{log}(\mathcal{S}, \theta, \mathcal{U}) = \log(2) + \frac{1}{m} \log F_{exp}^\pi(\mathcal{S}, \theta, \mathcal{U}).$$

Equation (3) shows that the approximation $F_{log}(\mathcal{S}, \theta, \mathcal{U})$ is sharply concentrated around $F_{log}(\mathcal{S}, \theta)$.

FIG. 6 illustrates an algorithm 600 that is implemented as software and executed by processor 202. Algorithm 600 is provided as background information as it solves the problem in the "elementary case" when 1) only 1 dataset is given and therefore 2) rados can be computed with all freedom. Blocks are considered further below.

The property of concentration above facilitates the algorithm 600 for learning from $\mathcal{S}$ with Rademacher observations in the standard classification setting. The following description sets out how processor 202 merges the rados from disjoint learning samples.

Let us denote the set of rados concatenated from the disjoint samples as $$\{(\pi_\sigma^1, \pi_\sigma^2): \sigma \in \mathcal{U}\} = \{(\Sigma_{i=1}^m (\sigma_i + y_i) x_i^1, \Sigma_{i=1}^m (\sigma_i + y_{\rho(i)}) x_{\rho(i)}^2): \sigma \in \mathcal{U}\}$$

Notice that the same $\sigma$ is used to subsample both $\mathcal{S}_1$ and $\mathcal{S}_2$. Because the $\rho(i) \neq i$ in general, the concatenation results in incoherent subsampling and does not equal the set $\{\pi_\sigma : \sigma \in \mathcal{U}\}$. Such equality is true only for four particular signatures, namely $\sigma_i = \pm 1, +y_i$ for all i; those are respectively the rados built on subset of negative and positive observations, the (unnormalised) mean operator $m\mu$ and the null vector.

Error-free concatenation for the whole set of rados corresponding to $\Sigma_m$ would essentially mean perfect ER; in fact, m of the rados are the sum over 1 example only. Therefore, $|\mathcal{U}|=2^m$ is not just intractable but actually not achievable without ER; nevertheless, as explained above, statistically this is not even necessary. The following description shows how processor 202 obtains error-free concatenation for a subset of rados based on prior knowledge.

Blocking is a phase in the ER process. Entities from a dataset are inserted into the same block if they share the same value of a blocking key. Blocking keys can be derived by values of either one, e.g. postcode, or multiple attributes shared by the datasets, postcode and gender, or a function of those, as the first letters of a surname. In other words, by considering only samples from one block processor 202 selects a subset (that block) of data samples such that the subset comprises samples with corresponding one or more of the feature values, that is, blocking keys.

Blocking keys induce a partition of the data equivalent to selecting a subset of the data samples.

As it will be explained later, processor 202 may consider an enlarged set of blocks, by taking all possible union of "basic blocks", that is, subsets, which are the one defined as explained above.

More formally, a positive number $K \leq \min(d_1, d_2)$ of features are shared between the two datasets, and each shared feature k has cardinality $C_k > 1$. In one example, processor 202 quantizes real-valued features. Labels act as additional shared attributes. A basic block is a subset of examples which occur with the same value for every shared feature and label, e.g., postcode=2000, gender="F" and y=1. More generally, blocks are unions of basic blocks, and may contain examples with postcode$\in$[2000,2999], gender="F" and y$\in\{-1,1\}$.

The number of basic blocks is $2\Pi_{k=1}^{K}C_k$; 2 is due to the two labels, which always induce two basic blocks. The number provides an upper bound on the quantity of distinct basic blocks. Indeed, some shared features might not bring addition information to build new blocks. The discount factor is $\alpha = \frac{1}{2}\Sigma_{k,k'} \Sigma_{a \in x_k, a' \in x_{k'}} \mathbb{1}\{x_{ik}=a \Leftrightarrow x_{ik'}=a', \forall i \in [m]\} + \Sigma_k \Sigma_{a \in x_k, b \in \{-1,+1\}} \mathbb{1}\{x_{ik}=a \Leftrightarrow y_i=b, \forall i \in [m]\}$ such that $H=2\Pi_{k=1}^{K}C_k-\alpha$ is the number of distinct basic blocks. For example, when k' is a replica of k, the inner summation is $C_k$; since it will be counted twice by the outer summation, all terms are divided by 2, therefore $\alpha=C_k$. Consequently, blocks are in number of $2^H-1$ as each basic block can be chosen or not in the union; 1 counts for the empty block.

Each block defines a rado.

Definition 2: Let $\mathcal{B}=\{b_t \subseteq \mathcal{S}, t \in [T]\}$, a sequence of blocks. A block Rademacher observation $\pi_t$ (consistent with $b_t$) is defined as $\pi_t = \Sigma_{i:(x_i,y_i) \in b_t} y_i x_i$.

Also, let $\Pi(\mathcal{B})\{\pi_t$ consistent with $b_t \in \mathcal{B}\}$. Definition 2 specializes also to basic blocks, the ones generating all the others by union. This last property transfers to the set of basic(-block) rados, because rados of unions of basic blocks are sums of basic rados. Therefore, the set of basic rados $\Pi(\mathcal{B}\mathcal{B})$ is a generator for all the block rados $\Pi(\mathcal{B})$—whose size is exponentially bigger. This proves the next Lemma:

Given the sets of blocks $\mathcal{B}$ and basic blocks $\mathcal{B}\mathcal{B} \subset \mathcal{B}$, it holds that $\forall \pi_t \in \Pi(\mathcal{B}), \exists C \subseteq \Pi(\mathcal{B}\mathcal{B})$ such that $\pi_t = \Sigma_{\pi_{t'} \in C} \pi_{t'}$.

FIG. 7 illustrates a further algorithm 700 based on this Lemma, which allows a very light implementation of sampling from $\Pi(\mathcal{B})$. Once all elements from $\Pi(\mathcal{B}\mathcal{B})$ are computed, we can avoid any other costly visit to the dataset at all. Distributed settings can greatly benefit too.

Returning back to data fusion, the following perfect blocking assumption may be used: For each pair of corresponding blocks $(b_1, b_2)$ defined on the disjoint learning samples, it holds that $\{i:(x_i^1, y_i) \in b^1\} = \{i:(x_{\rho(i)}^2, y_{\rho(i)}) \in b^2\}$ that is, the two blocks contain exactly views of the same examples. The concatenation of the block rados is error-free.

Let $F_{log}((\mathcal{S}_1, \mathcal{S}_2), \theta, \mathcal{U}) = \log(2) + \frac{1}{m}\log\frac{1}{n}\sum_{\sigma \in \mathcal{U}}\exp(-\theta^T(\pi_\sigma^1, \pi_\sigma^2))$ Let $\mathcal{U}(\mathcal{B})=\{\sigma:\pi_\sigma \in \Pi(\mathcal{B})\}$. Picking any $\mathcal{U} \subseteq \mathcal{U}(\mathcal{B})$, we have the equivalence:

$F_{log}((\mathcal{S}_1, \mathcal{S}_2), \theta, \mathcal{U}) = F_{log}(\mathcal{S}, \theta, \mathcal{U})$.

The following equations provide the proof for the logistic loss expression above:

$$F_{log}((\mathcal{S}_1, \mathcal{S}_2), \theta, \mathcal{U}) - \log(2) = \frac{1}{m}\log\frac{1}{n}\sum_{\sigma \in \mathcal{U}}\exp\left(-\begin{pmatrix}1 & 2\\ \sigma & \sigma\end{pmatrix}\theta\right) \quad (20)$$

$$= \frac{1}{m}\log\frac{1}{n}\sum_{\sigma \in \mathcal{U}}\exp\left(-\theta^T\left(\sum_i (\sigma_i + y_{i(1)})x_{i(1)}^1, \sum_i (\sigma_i + y_{i(2)})x_{i(2)}^2\right)\right)$$

$$= \frac{1}{m}\log\frac{1}{H}\sum_{\sigma \in \mathcal{U}(\mathcal{B})}\exp(-\theta^T \cdot \left(\sum_{i:(x_{i(1)}^1, y_{i(1)}) \in b_1} y_i x_i^1, \sum_{i:(x_{i(2)}^2, y_{i(2)}) \in b_2} y_i x_i^2\right))$$

$$= \frac{1}{m}\log\frac{1}{H}\sum_{\sigma \in \mathcal{U}(\mathcal{B})}\exp\left(-\theta^T\sum_{i:(x_i,y_i) \in b}y_i x_i\right) \quad (21)$$

$$= \frac{1}{m}\log\frac{1}{H}\sum_{\sigma \in \mathcal{U}(\mathcal{B})}\exp(-\theta_\sigma^T)$$

$$= F_{log}(S, \theta, \mathcal{U}(\mathcal{B})) - \log(2) \quad (22)$$

$$= F_{log}(S, \theta, \mathcal{U}) - \log(2)$$

where we have used $\mathcal{U} = \mathcal{U}(\mathcal{B})$ in (20, 22), and the above perfect blocking assumption in (21).

FIG. 8 illustrates a further algorithm 800 that uses algorithm 700 in FIG. 7 for sampling rados.

Processor 202 may solve convex problems using L-BFGS. During optimization rados can cause the exponentials in Equation (18) to diverge; therefore each rado may be normalized by either the number of training samples summed by the rados or the sample size m.

As shown above minimizing the rado-risk as criterion for classification is effective. In another example, the feature space is split between subsets of demographic variables, e.g. age, country of birth, and income-related ones, e.g. wage per hour, capital gains. Three features, i.e. sex, age, race, may be assumed to be shared. Age is a continuous variable, thus processor 202 considers its quantiles The task is to classify whether a person earns more than $50k a year.

n∈{50,5000}. The number of rados sampled by Algorithm 500 may be between 50 to 5000. Processor 202 may only retain distinct ones and perform the training with a smaller set. In one example, no regularization applied.

Second, there is another relevant situation in practice. Assume we are able to predict only in either $\mathcal{X}_1$ or $\mathcal{X}_2$, but still we have learnt a model on the whole $\mathcal{X}$. Even though the loss functions we have presented are not designed to tackle this problem, we may simply split the models by the relative subspaces $\mathcal{X}_j$. This naive heuristic may work well in light of the Johnson-Lindenstrauss thereom.

Parallel and distributed learning. Rados are linear operators, therefore parallelizable; concurrent computation greatly benefits the method. This is facilitated by the data being partitioned and effectively never merged.

The communication protocol is: once rados are computed where the data resides, they are sent in one shot to a central learner. Only H basic rados are needed; data need not to be accessed anymore. Sampling of block rados can be distributed as well if needed.

Under the assumption that resources are not scarce in the central unit, the bulk of learning is then carried out by standard convex optimization. Rados also help data compression—n can be significantly smaller than m—and therefore have a positive effect on scalability of the central optimizer.

In one example, two data providers are interested in improving predictive models, but aim to minimize information share. A learner receives rados and trains the model; the learner can be either a third agent or one of the data providers. The providers need to protect against both potential man-in-the-middle attacks and the learner itself. The only information sent through the channel consists of rados; examples are never shared. Note that no information about σs or m is ever exchanged either. Any attempt to reconstruct the datasets would lack enough information.

In one example, the datasets contain views of the same observations, their labels are consistent and always present, and blocking is perfect. All those assumptions are not essential for the algorithms, thanks to the statistical properties that rados enjoy.

Without any shared feature but the label processor 202 determines only 4 rados. One of those is the sufficient statistic w.r.t. to the label for minimizing the logistic loss: all supervision for leaning is incorporated in this quantity.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilizing terms such as "estimating" or "processing" or "computing" or "calculating", "optimizing" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A computer implemented method for training a classifier on confidential data in a first data set and a second data set, the method comprising:
   collecting, on a first user device by way of a user interface, each of multiple first data samples, each of the multiple first data samples comprising multiple first feature values and a first label that classifies that first data sample;
   creating first non-confidential training data by determining each of multiple first training samples from the multiple first data samples, each of the multiple first training samples preserving the privacy of the confidential data in the multiple first data files by:
   (a) selecting a first subset of the multiple first data samples such that the first subset comprises data samples with identical first feature values, and
   (b) combining the first feature values of the first data samples of the first subset based on the first label of each of the first data samples of the first subset, by determining a weighted sum of the first feature values of the first data samples of the first subset wherein the feature value of a feature of the training sample is the weighted sum of the first feature values of that feature of the first data samples of the first subset, wherein the weighted sum comprises a sum of first feature values of that feature multiplied by the respective first labels of each of the data samples of the first subset;
   collecting, on second user device by way of a user interface, each of multiple second data samples, each of the multiple second data samples comprising multiple second feature values and a second label that classifies that second data sample;
   creating second non-confidential training data by determining each of multiple second training samples from the multiple second data samples, each of the multiple second training samples preserving the privacy of the confidential data in the multiple second data samples by:
   (a) selecting a second subset of the multiple second data samples such that the second subset comprises data samples with identical second feature values, and
   (b) combining the second feature values of the second data samples of the second subset based on the second label of each of the second data samples of the second subset, by determining a weighted sum of the second feature values of the second data samples of the second subset wherein the feature value of a feature of the training sample is the weighted sum of the second feature values of that feature of the second data samples of the second subset, wherein the weighted sum comprises a sum of second feature values of that feature multiplied by the respective second labels of each of the data samples of the second subset;
   merging each of the multiple first training samples with one of the multiple second training samples that is based on the same identical feature values as that first training sample to create merged non-confidential training data;

training a classifier on the confidential data from the first data set and the second data set without access to the confidential data and with access to the merged non-confidential training data by calculating a classifier weight associated with a feature index from the merged non-confidential training data; and classifying, using the trained classifier, a test value by determining a classification of the test value based on the classifier weight.

2. The method of claim 1, wherein selecting the first subset comprises selecting all of the multiple first data samples with identical first feature values.

3. The method of claim 1, wherein
the first data samples have signed real values as first features values, and
the first label is one of '−1' and '+1'.

4. The method of claim 1, wherein selecting the first subset comprises selecting the first subset such that the first subset comprises only first data samples with identical one or more of the multiple first feature values.

5. The method of claim 1, wherein merging each of the multiple first training samples with one of the multiple second training samples comprises determining a third training sample comprising
the one or more identical feature values,
the first feature values of that first training sample other than the corresponding one or more feature values, and
the second feature values of the one of the multiple second training samples other than the corresponding one or more feature values.

6. A non-transitory computer readable medium has an executable program stored thereon that when executed causes a computer to perform the method of claim 1.

7. A computer system for training a classifier on confidential data in a first data set and a second data set, the computer system comprising:
one or more processors;
a first data collection device configured to: store the confidential data in the first data set comprising multiple first data samples, each of the multiple first data samples comprising multiple first feature values and a first label that classifies that first data sample;
create first non-confidential training data by determining each of multiple first training samples from the multiple first data samples, each of the multiple first training samples preserving the privacy of the confidential data in the multiple first data samples by:
(a) selecting a first subset of the multiple first data samples such that the first subset comprises data samples with identical first feature values, and
(b) combining the first feature values of the first data samples of the first subset based on the first label of each of the first data samples of the first subset, by determining a weighted sum of the first feature values of the first data samples of the first subset wherein the feature value of a feature of the training sample is the weighted sum of the first feature values of that feature of the first data samples of the first subset; wherein the weighted sum comprises a sum of first feature values of that feature multiplied by the respective first labels of each of the data samples of the first subset, a second data collection device configured to:
store the confidential data in the second data set comprising multiple second data samples, each of the multiple second data samples comprising multiple second feature values and a second label that classifies that second data sample;
create second non-confidential training data by determining each of multiple second training samples from the multiple second data samples, each of the multiple second training samples preserving the privacy of the confidential data in the multiple second data samples by:
(a) selecting a second subset of the multiple second data samples such that the second subset comprises data samples with identical second feature values, and
(b) combining the second feature values of the second data samples of the second subset based on the second label of each of the second data samples of the second subset, by determining a weighted sum of the second feature values of the second data samples of the second subset wherein the feature value of a feature of the training sample is the weighted sum of the second feature values of that feature of the second data samples of the second subset, wherein the weighted sum comprises a sum of second feature values of that feature multiplied by the respective second labels of each of the data samples of the second subset;

a data processing device configured to:
merge each of the multiple first training samples with one of the multiple second training samples that is based on the same identical feature values as that first training sample to create merged non-confidential training data;
train a classifier on the confidential data from the first data set and the second data set without access to the confidential data and with access to the merged non-confidential training data by calculating a classifier weight associated with a feature index from the merged non-confidential training data; and
classify, using the trained classifier, a test value by determining a classification of the test value based on the classifier weight.

* * * * *